(12) United States Patent
Miller

(10) Patent No.: US 7,074,337 B2
(45) Date of Patent: *Jul. 11, 2006

(54) METHODS AND APPARATUSES FOR FILTERING WATER

(75) Inventor: Robert L. Miller, Florence, CO (US)

(73) Assignee: Jeffrey S. Melcher, Bethesda, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/038,457

(22) Filed: Jan. 21, 2005

(65) Prior Publication Data

US 2005/0230325 A1  Oct. 20, 2005

Related U.S. Application Data

(63) Continuation-in-part of application No. 10/939,335, filed on Sep. 14, 2004, which is a continuation of application No. 10/636,808, filed on Aug. 8, 2003, now Pat. No. 6,932,910.

(60) Provisional application No. 60/632,076, filed on Dec. 1, 2004, provisional application No. 60/618,605, filed on Oct. 15, 2004, provisional application No. 60/598,443, filed on Aug. 4, 2004, provisional application No. 60/542,872, filed on Feb. 10, 2004, provisional application No. 60/538,240, filed on Jan. 23, 2004, provisional application No. 60/411,382, filed on Sep. 18, 2002, provisional application No. 60/408,281, filed on Sep. 6, 2002, provisional application No. 60/406,059, filed on Aug. 27, 2002, provisional application No. 60/404,403, filed on Aug. 20, 2002, provisional application No. 60/402,526, filed on Aug. 12, 2002.

(51) Int. Cl.
*B01D 37/04* (2006.01)

(52) U.S. Cl. .................... 210/744; 210/167; 210/776; 210/805; 210/806; 210/94; 210/97; 210/104; 210/195.1; 210/196; 210/197; 210/198.1; 210/255; 210/258; 210/262; 134/10

(58) Field of Classification Search ................ 210/767, 210/255, 743, 744, 776, 805, 806, 94, 97, 210/104, 194, 195.1, 196, 197, 198.1, 258–262; 134/10, 40
See application file for complete search history.

(56) References Cited

U.S. PATENT DOCUMENTS

| | | | | | |
|---|---|---|---|---|---|
| 48,559 | A | * | 7/1865 | Kaufman | 210/255 |
| 56,197 | A | * | 7/1866 | Ferris | 426/422 |
| 60,445 | A | * | 12/1866 | Weyde | 210/255 |
| 77,746 | A | * | 5/1868 | Mathews | 210/255 |
| 116,515 | A | * | 6/1871 | Weare | 210/255 |
| 370,674 | A | * | 9/1887 | Bang et al. | 99/277.1 |
| 389,427 | A | * | 9/1888 | Wells et al. | 210/255 |
| 542,586 | A | * | 7/1895 | Eassie et al. | 210/189 |
| 621,803 | A | * | 3/1899 | Felts | 210/255 |
| 645,190 | A | * | 3/1900 | Schantz | 210/737 |
| 669,335 | A | * | 3/1901 | Behrend | 210/127 |
| 673,868 | A | * | 5/1901 | Henderson | 210/255 |
| 690,082 | A | * | 12/1901 | Snyder | 209/4 |
| 1,290,820 | A | * | 1/1919 | Winkel | 210/315 |
| 1,320,324 | A | * | 10/1919 | Dunkle | 422/269 |
| 1,442,306 | A | * | 1/1923 | Stonebraker | 210/255 |
| 1,988,612 | A | * | 1/1935 | Stindt | 210/255 |
| 2,582,401 | A | * | 1/1952 | Stinson | 210/255 |

(Continued)

Primary Examiner—Robert James Popovics
(74) Attorney, Agent, or Firm—Jeffrey S. Melcher; Manelli Denison & Selter

(57) ABSTRACT

The invention relates to a method and apparatus for filtering or purifying water.

16 Claims, 8 Drawing Sheets

U.S. PATENT DOCUMENTS

| | | | |
|---|---|---|---|
| 2,979,062 A * | 4/1961 | Umbricht et al. | 134/66 |
| 3,386,181 A * | 6/1968 | Steinacker | 34/345 |
| 3,473,480 A * | 10/1969 | Kollmai | 417/540 |
| 3,945,918 A * | 3/1976 | Kirk | 210/703 |
| 4,297,213 A * | 10/1981 | Airey et al. | 210/195.1 |
| 4,753,735 A * | 6/1988 | Figiel | 210/664 |
| 4,913,345 A * | 4/1990 | Setter | 239/127 |
| 4,975,199 A * | 12/1990 | Woster et al. | 210/638 |
| 5,040,950 A * | 8/1991 | Dalquist et al. | 417/234 |
| 5,080,793 A * | 1/1992 | Urlings | 210/603 |
| 5,417,855 A * | 5/1995 | Gershenson | 210/315 |
| 5,496,469 A * | 3/1996 | Scraggs et al. | 210/177 |
| 5,500,976 A * | 3/1996 | Rohrbacher et al. | 15/320 |
| 5,501,396 A * | 3/1996 | Rohrbacher et al. | 239/7 |
| 5,766,465 A * | 6/1998 | Yamamoto et al. | 210/255 |
| 5,993,739 A * | 11/1999 | Lyon | 422/31 |
| 5,996,604 A * | 12/1999 | Doelle et al. | 137/1 |
| 6,082,631 A * | 7/2000 | Aslakson | 239/172 |
| 6,234,409 B1 * | 5/2001 | Aslakson | 239/172 |
| 6,302,967 B1 * | 10/2001 | Rohrbacher et al. | 134/10 |
| 6,592,753 B1 * | 7/2003 | Lee | 210/112 |
| 6,932,910 B1 * | 8/2005 | Miller | 210/743 |
| 2001/0022323 A1 * | 9/2001 | Aslakson | 239/172 |
| 2004/0094490 A1 * | 5/2004 | Miller | 210/805 |
| 2005/0029200 A1 * | 2/2005 | Miller | 210/743 |
| 2005/0230325 A1 * | 10/2005 | Miller | 210/770 |

* cited by examiner

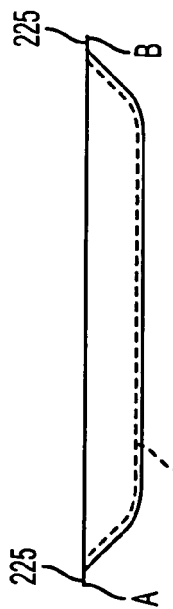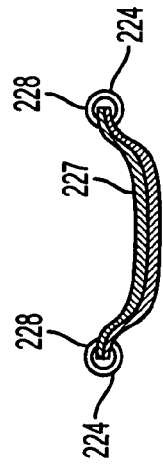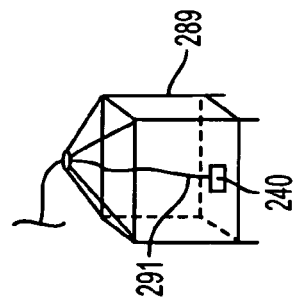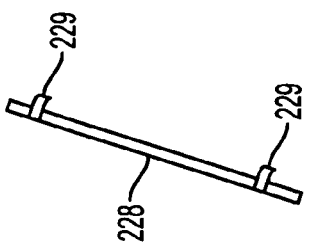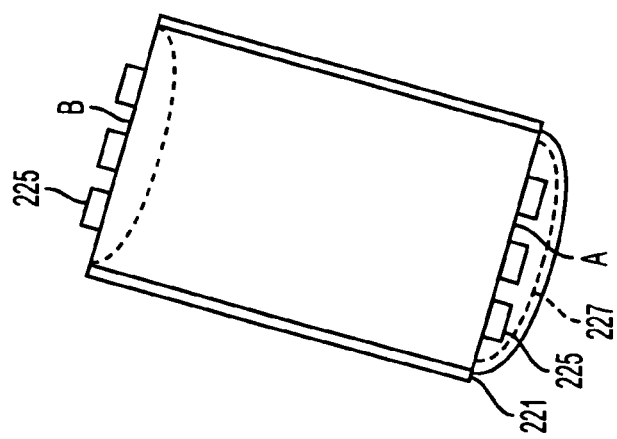
FIG. 4D
FIG. 4E
FIG. 4G
FIG. 4F
FIG. 4C

METHODS AND APPARATUSES FOR FILTERING WATER

This application is a Continuation-in-Part of U.S. appl'n Ser. No. 10/939,335, filed Sep. 14, 2004, which is a Continuation of U.S. appl'n Ser. No. 10/636,808, filed Aug. 8, 2003, now U.S. Pat. No. 6,932,910, which claims priority to U.S. appl'n Ser. No. 60/411,382, filed Sep. 18, 2002; 60/408,281, filed Sep. 6, 2002; 60/406,059, filed Aug. 27, 2002; 60/404,403, filed Aug. 20, 2002; and 60/402,526, filed Aug. 12, 2002, the complete disclosures of which are incorporated herein by reference. This application also claims priority to U.S. patent appl'n Ser. Nos. 60/632,076, filed Dec. 1, 2004; 60/618,605, filed Oct. 15, 2004; 60/598,443, filed Aug. 4, 2004; 60/542,872, filed Feb. 10, 2004; and 60/538,240, filed Jan. 23, 2004, the complete disclosures of which are incorporated herein by reference.

FIELD OF THE INVENTION

The invention relates to methods and apparatuses for filtering and/or purifying water, for example, from wash solutions used in spray washing, steam cleaning or car washes, as well as water run off from other applications, and well, river, lake and ocean water.

BACKGROUND OF THE INVENTION

There have been many attempts to filter water. One such conventional recycling apparatus is sold commercially under the Cyclonator™ name. A description can be found on the internet at www.cyclonator.com. This system uses numerous hoses to and from a specially designed washing platform, an additional separate filtering tank to remove larger debris and oils, a special holding tank, and two vacuum canister type filters that require expensive filters. This recycling apparatus provides no visual monitoring ability except for vacuum gauges, has no pH monitoring nor automatic adjustment capability, and the location of the unit has to be in close proximity to the wash platform and the power washer. Furthermore, the filtering apparatus is difficult to maintain, requires a large area of space and numerous extra equipment at additional cost. Moreover, the vacuum or pressure used to force the wash solution through a filter can undesirably force dirt through filters.

There are many other systems that use pressure or vacuum, including those from Cyclonator standard filtration weir, www.cyclonator.com; Powder-X Pretreatment Station, Powder-X Coating Systems, Inc., www.powder-x-.com; Rapid Pretreatment Station, www.rapidengineering.com; PKG Equipment, Inc., www.pkgeguipment.com; Water Treatment Tech Equipment, MFG.; Pressure Island; Arkal Filtration; ADF-Liquid Filtration; Kemco Systems; and Tiger Enterprises, 39126 Alston Ave., Zephyrhills, Fl 33542.

Two open water filtration systems, CFS3 and CMAFU-2 are commercially sold by HydroEngineering, disclosed at www.hydroblaster.com. However, in these systems the filtered water is not continuously filtered through the filter media and there is only one filter media. While there are other filtering systems disclosed on the website which refer to circulation of water for multiple passes through polishing media (see description of Model ACF3) this appears to be a closed system since hydrobiodigesters must be utilized.

Furthermore, conventional water purification systems for producing potable water from non-potable water are complicated, difficult to use and require extensive maintenance. An example of such a system utilizes reverse osmosis.

There is a need for an improved water filtering apparatus that does not require a vacuum or pressure pumps, provides easy visual inspection of the filters during operation, is easy to maintain and operate, and can be scaled to any size operation. There is also need for a simplified water purification system for producing potable water from non-potable water.

BRIEF DESCRIPTION OF THE DRAWINGS

FIGS. 4C through 4E illustrate views of a filter assembly;
FIG. 4F illustrates a clamp for mounting a filter material in a filter assembly;
and
FIG. 4G illustrates a basin for collecting filtered solution.

DETAILED DESCRIPTION OF PREFERRED EMBODIMENTS

The present invention will now be described with reference to preferred embodiments as shown in the Figures. The claimed invention is not limited to these preferred embodiments.

Figure 1A:
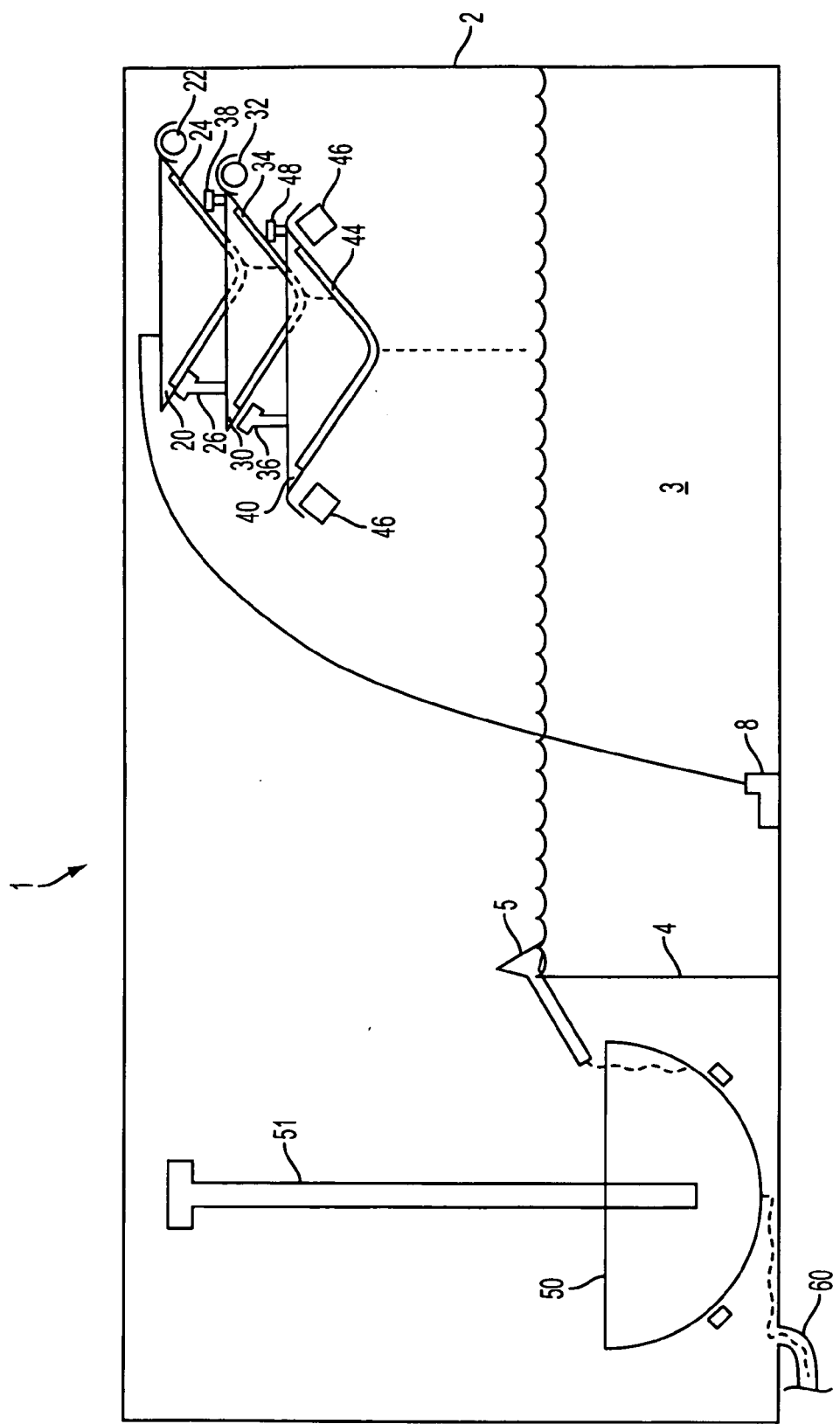
FIG. 1A illustrates a side view of the water filtering apparatus.

As shown in FIG. 1A, the water filtering apparatus 1 comprises a main tank 2. The main tank 2 can be sized as desired for the particular application. An example of a suitable size tank 2 is 4 feet high by 4 feet wide by 8 feet long.

The main tank 2 is constructed of 14 gauge mild steel, but can be constructed of any desired material that is suitable to hold the filtered solution. Examples of suitable materials include, but are not limited to, metals, alloys, rubbers, plastics, glass, coated wood, or fiberglass. Preferably, if metal parts are utilized in the recycling apparatus 1, the metal parts are powder coated to prevent rust.

The main tank 2 contains a holding tank 3 defined by baffle 4. The baffle 4 can be formed from the same material as the holding tank, or any material suitable to hold the filtered solution. If desired, separate tanks can be used instead of splitting one large tank into smaller tanks with the use of baffles.

The main tank 2 contains three cascading filter assemblies 20, 30 and 40. The filter assemblies 20, 30 and 40 are sized to removably fit within the main tank 2, as shown in FIG. 1. More or less filter assemblies can be utilized as desired for the particular application.

Each filter assembly has an associated filter material 24, 34 and 44. The filter material can be selected for the particular application. Preferably, the filter material is a small size in the direction of the water flow to enhance the life time of the smaller filter size material. For example, filter paper 24 can be 15 micron size, filter paper 34 can 1 micron size, and filter paper 44 can be 0.5 micron size.

Filter assemblies 20 and 30 are constructed such that filter assembly 20 can be rotated up about axis 22 to expose filter assembly 30, and filter assembly 30 can rotated up about axis 32 to expose the filter assembly 40. The filter assemblies 20 and 30 rest on respective holders 26 and 36. In this manner, the filter material can easily be changed for each filter assembly 20, 30 and 40 without completely removing the filter assembly (although they can be removed easily if needed) from the main tank 2. Filter assembly 40 rests on holders 46. Respective handles 38 and 40 facilitate removal of the filter assemblies 30 and 40 from the main tank 2, when desired.

The filter assemblies 20, 30 and 40 are constructed such that water to be filtered is introduced to filter assembly 20. After the water passes through the filter material 24 it falls into filter assembly 30. After the water passes through the filter material 34 it falls into filter assembly 40. After the water passes through filter material 44 it falls into holding tank 3.

The filter assemblies and apparatus can also utilize any and all apparatus disclosed in my copending U.S. Ser. No. 10/636,808, filed Aug. 7, 2003, the complete disclosure of which is incorporated herein by reference.

Figure 1B:
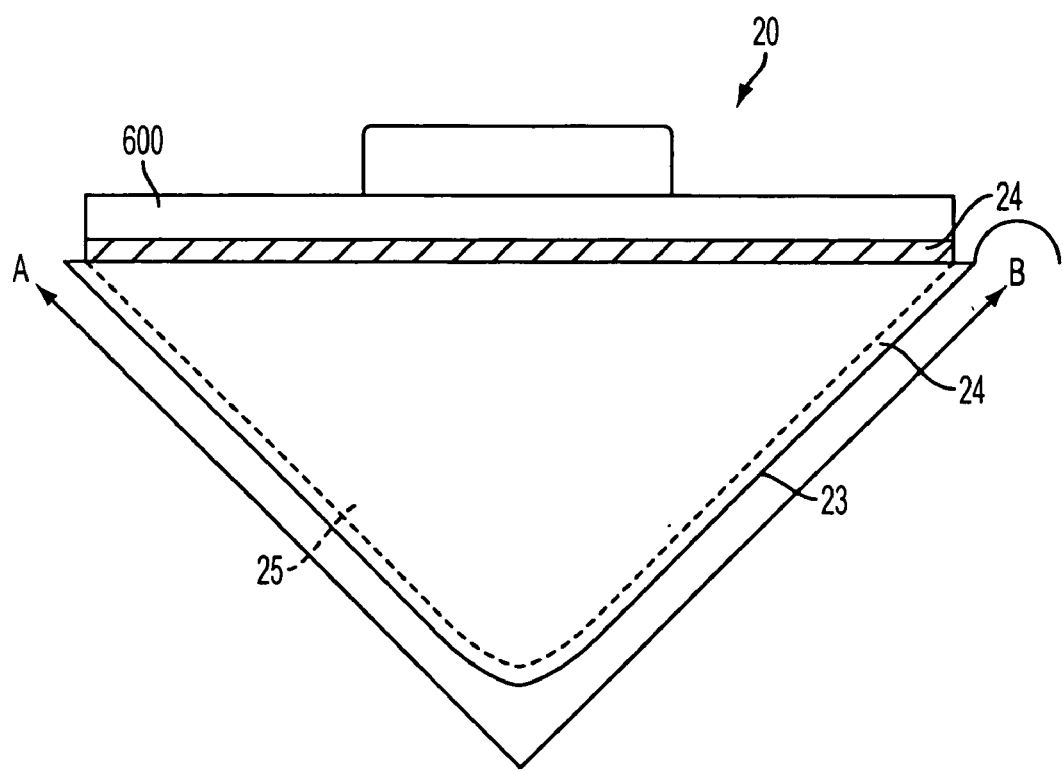
FIG. 1B illustrates a view of a filter assembly.

As shown in FIG. 1B, the filter assembly 20 comprises ½ to ¾ inch expanded steel mesh 23 having a V-shape, but can be any shape to allow maximum ability in any given circumstance. In this example, the ends of the filter assembly 20 are sealed using plates 25 designed to conform to whatever style filter holder is needed. The filter material 24 is held in place using the magnetic filter holder 600 as described below. In this example a 5 foot wide filter paper is uses, so the expanded steel mesh 23 is sized such that it is about 5 feet in length, shown from A to B in FIG. 1B.

The filter assembly 40 is constructed and arranged such that during operation, the filtered solution drops about 1 inch to 30 inches, more preferably from about 2 inches to about 24 inches, more preferably from about 3 inches to about 12 inches, and most preferably about 6 to about 8 inches, before contacting the surface of the filtered water in the holding tank 3 to provide suitable aeration to prevent or inhibit mold formation and to allow volatiles to escape.

Preferably, the filter assemblies are offset so that water dripping from the bottom of a higher filter assembly contacts a side surface of a lower filter assembly. Even more preferably, the filter assemblies 20, 30 and 40 are v-shaped and constructed such that water to be filtered is delivered to at least one side of filter assembly 20, filtered water dripping from the bottom of the v in filter assembly 20 contacts a side of filter assembly 30 and filtered water dripping from the bottom of the v in filter assembly 30 contacts a side of filter assembly 40. In this manner, the water path though the filter material is significantly longer than merely the thickness of the filter material. The filter assemblies can be formed in many different ways to conform to the needs of the situation.

If desired, the filtered water in holding tank 3 can flow therefrom into another filter assembly 50. The filter assembly 50 is constructed to be removable from the main tank 2. To facilitate ease of removal, the filter assembly 50 contains an arm 51. The filter assembly 50 as an associated filter material 54. After the water flows through the filter material 54, it leaves the main tank 2 through exit 60. However, filtered water can be taken directly from the holding tank 3 for use.

A power washer can be connected to the filtering apparatus 1 in a manner similar as disclosed herein below or my earlier U.S. appl'n Ser. No. 10/939,335, filed Sep. 14, 2004, such that used wash solution can be collected and filtered, and filtered wash solution can be supplied from the holding tank 3 to the power washer for reuse.

The water level in the holding tank 3 can be monitored using a water lever monitor 5, which can be any conventional water level monitor, such as commonly used in toilets or the well-known water levelers used in the commercially available Swamp Cooler™.

In an alternative embodiment, a closed door system (CDS) can be utilized in which the main tank 2 is used as the holding tank for the wash water that will be going to the power washer. In this embodiment, a typical tank is 4 feet high by 4 feet wide by 10 feet long. It will then have a holding tank capacity of at least 266 gallons. 4 feet of the length can go under the incoming filters and 6 feet can become a prewash holding tank by using a baffle. The baffle can be sized to provide any depth of water, for example 18 inches from bottom of tank up. In this embodiment, no water is discharged to the sewer. The wash water can contain wash chemicals as desired.

The size and structure of the filter assembly can be varied as desired. Preferably, the size of the filter should be such that at least a 5 gallon per minute flow rate is provided under ambient pressure and gravity.

The preferred filter material is a rolled filter sheet material that is easily obtained from commercial manufacturers or from a filter supply company. The spool is usually about three feet to about five feet wide and about one hundred or more feet long. Preferably, the filter sheet material is at least 20 inches wide, more preferably at least 30 inches wide, and most preferably at least 60 inches wide. The filter sheet material is easily cut to any desired length or width to fit the filter assembly. Examples of preferred commercially available filter sheet materials include, but are not limited to, the BR-60 and BR-80 series from Mountain States Filter, Colorado. The filter sheet material easily takes any desired shape in the filtering apparatus. While inexpensive flat sheets of filter cloth, synthetic or natural, are preferred filters, any suitable filter material can be used as desired for the particular application. The filters usually last about 1 week in duration before changing is required, but should be monitored daily. Usually, the filter material is formed from plastics. However, in certain applications, the filter material preferably comprises cellulose or wood products for environmental friendly disposal, such as incineration or shredding.

The filter can be selected by the end user to provide the desired level of filtering based on the particular application. It has been found that filters having a size of less than 10 microns are preferred. A preferred arrangement is the use of a filter having a size of about 3 to 8 microns in the filter assembly 30, and about 1 micron or less in each of the filter assemblies 32 and 34. However, the size of the filter can be varied as desired for the particular application.

Prior to introducing the water into filter 20, oil can be mechanically or manually removed from the water using well know techniques, such as an oil skimmer.

The main tank 2 also preferably contains recycling apparatus, such as pump 8, which continually recycles filtered water from holding tank 3 to at least one of the filter assemblies 20, 30 or 40. It is believed that this continuous recycling is responsible for unexpectedly removing unwanted contaminates, such as those shown in the Examples, which the filter material is not know for being capable of removing. It is also believed that the filter performance increases over time due to sediment building in the filter material. Furthermore, it is also believed that salts present in solution may crystallize out of solution on the filters during the continuous recycling. It is also believed that the aeration reduces unwanted buildup of undesired organic volatiles and even facilitates removal of unwanted organic compounds and salts from the water. Using the present invention, it has surprisingly been found that numerous unwanted salts, inorganic compounds and organic compounds are surprisingly removed using filter materials that are known not be capable of removing these compounds.

A small electrical charge or magnets can be applied to the system to enhance the capabilities of the filter media. For example, an electric jolt to the solution to be treated can change the properties of the contaminants and make the filter media more effective. Furthermore, a UV light source can be used to provided UV light to the filtered water in the holding tank or to the filtered water anywhere as desired in the filtering apparatus.

The state of Colorado is currently in an extreme drought condition and the land that many businesses are located on does not accommodate leaching a large amount of water discharge through the sewage leach field. Public sewage may also not be within reach. With my new water filtering apparatus, the wastewater and the drought are no longer an issue.

This embodiment is useful for purifying water to meet EPA guidelines for disposal. It has been extensively tested at Colorado Department of Transportation sites to purify water running off from trucks, which contains salts, metals, inorganic compounds and organic compounds that the EPA prohibits from disposing in sewers. The filtering apparatus removed all of the materials the EPA required and the filtered water complied with EPA guidelines for disposal in sewers. The filtering apparatus can also be used for recycling wash solutions, such as spray washing, car washes, steam washers and laundry machines. Further, the filtering apparatus is applicable whenever purifying to comply with environmental guidelines, or recycling of water and/or chemicals present in the water is desired.

Horse Water

Figure 2A:
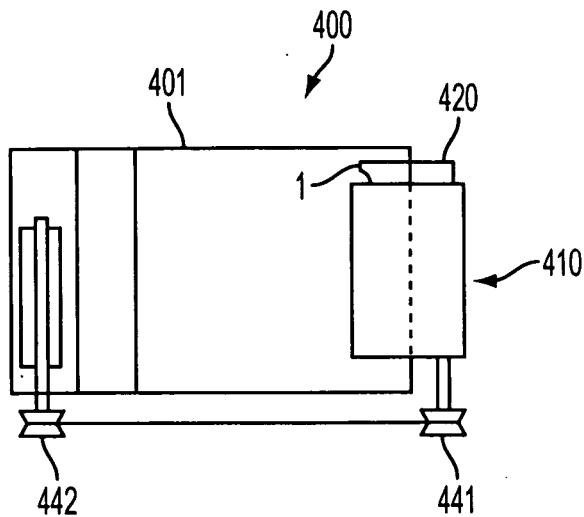
FIG. 2A illustrates a view of a horse water filtering apparatus.
Figure 2B:
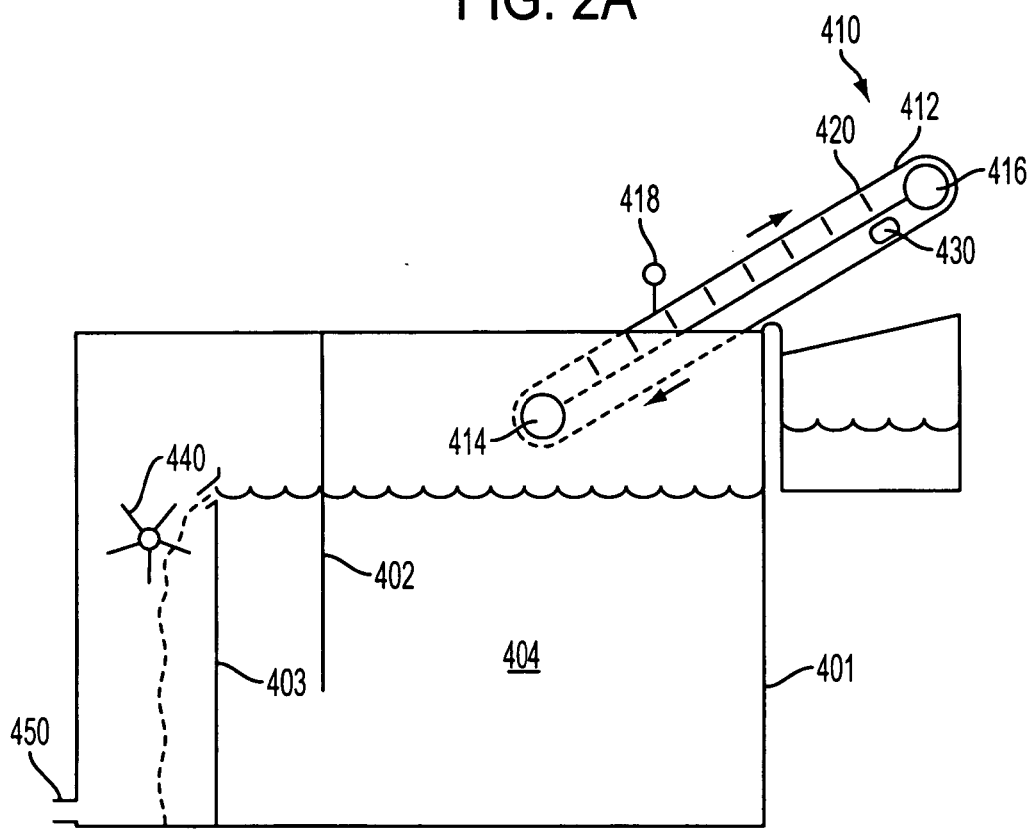
FIG. 2B illustrates a view of a horse water filtering apparatus.

Horses are sensitive to elevated levels of iron in water. It has been found that the method and apparatus described herein can be used to reduce iron levels, as well as undesirable heavy metals, in water to make it safer for horses. Any of the cascading filter systems described herein can be used. If desired, a self generating horse water filtering apparatus 400 as shown in FIGS. 2A–2B can also be used.

The horse water filtering apparatus includes main tank 401. A holding tank 404 is defined by the main tank 401 and baffles 401 and 402.

A rotating filter assembly 410 includes filter material 412. The filter material 412 is sized to remove iron from the water. Preferably, the filter material 412 is about 0.2 micron or less.

The filter material 412 rotates about shafts 414 and 416. Water to be filtered is introduced by water input 418. The water flows through the filter material 412 and drops onto collecting sheet 420. The filtered water drops off of the collecting sheet 420 and into holding tank 404.

Sediments removed by the filter material 412 drop off of and into a sediment trap 428. Optionally, to facilitate sediment removal, air can be blown through the filter material 412 from air supply 430. The sediment trap 428 can be a light-weight trap that is removable from the main tank 401 for easy cleaning.

The filter material 412 is rotated during operation. Water leaving the holding tank 404 can be used to drive a paddle wheel 440 or other device for powering the rotation of the filter material 412, such as solar, wind, electrical, gas or other power means. If a paddle wheel 440 is used, the paddle wheel 440 can be connected to the shaft 416 using pulleys 441 and 442 to drive the filter material 412.

The paddle wheel 440 can also be used to drive a bellows to power the air supply 430 to clean the filter material 412.

The filtered water can exit the main tank 401 through exit 450 and flow to a water trough to be consumed by horses.

Preferably, a biodegradable filter material 412 is used, such as wood fiber.

Water Clean Up Post Forest Fire.

When forest fires burn a large area of vegetation, it has been found that the vegetation releases a significant quantity of undesirable contaminates, such as lead, mercury, and other heavy metals. Since the filtering systems described herein are capable of removing such contaminates from water on a large scale economically, the runoff water from streams and creeks leaving the forest fire area can easily be purified using the present invention.

Potable Water

Figure 3A:
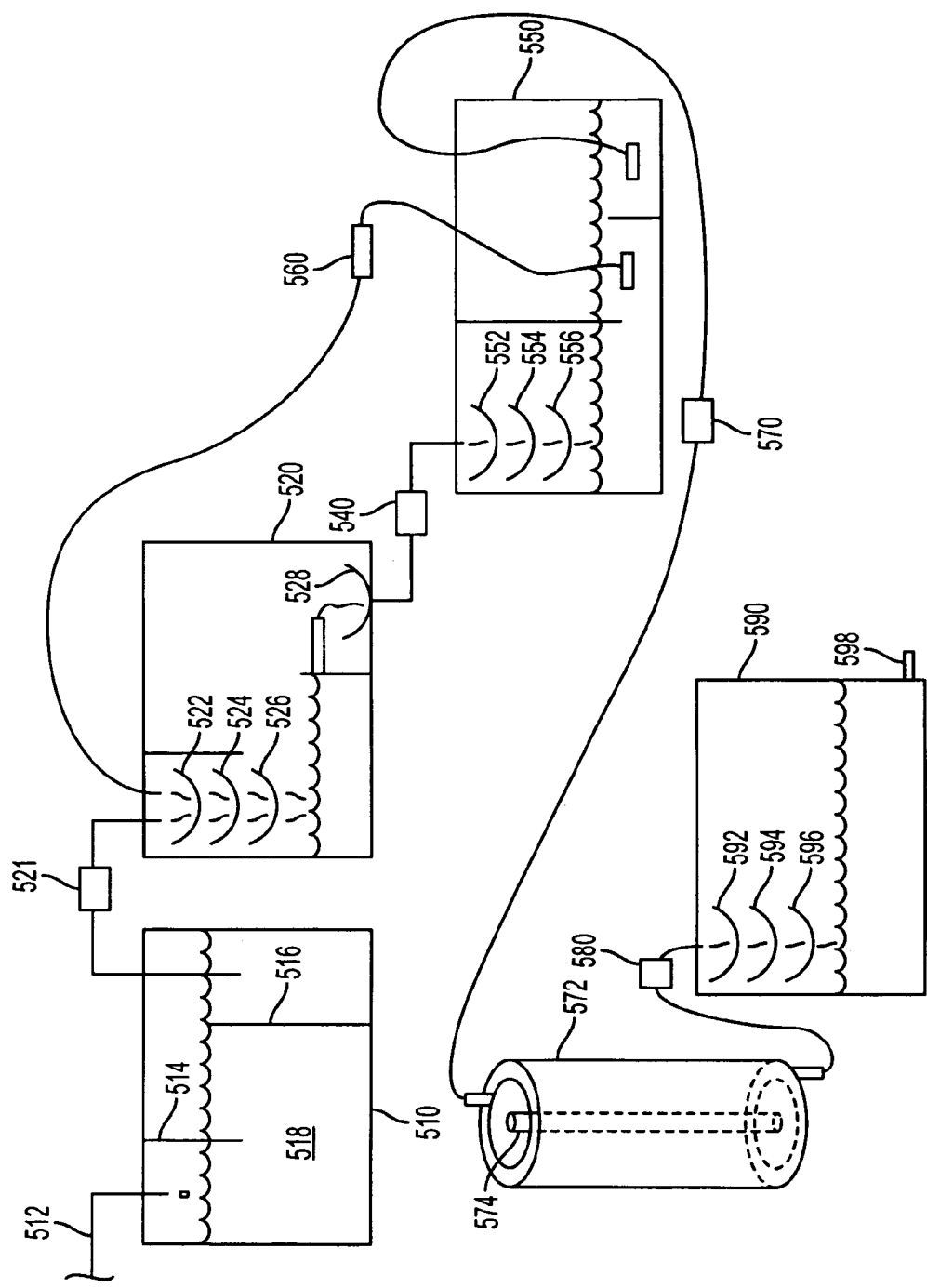
FIG. 3A illustrates a view of a potable water filtration system.

The potable water system will be described with reference to FIGS. 3A and 3B.

Incoming water to be treated flows through a conduit 512 and into a pre-sediment tank 510 where anti-algae fighting additives can be introduced to the contained water 518. The pre-sediment tank 510 can comprise baffles 514 and 516 to facilitate removal of sediments from the water 518. If desired, other designs for removing sediments from the incoming water can be utilized.

The water is then pumped into a primary filtration tank 520 using pump 521 and filtered using the degree of filters as deemed necessary. A cascading filter system having four filters is shown in FIG. 3A. The first filter 522 is a 1 micron filter, the second filter 524 is a 0.5 micron filter and the third filter 526 is a 0.2 micron filter. Any desired filter size, such as from about 0.01 micron to about 10 micron filters, can be used as desired for the particular application. The water should flow through a 0.2 micron or less filter. The preceding filters having a larger size are used to prefilter the water to extend the life of the 0.2 micron or less filter. The water then can flow through a fourth filter 528 if desired.

The water is then drained or pumped using pump 540 into a secondary filtration tank 550 containing a series of filters 552, 554 and 556. The water can be continuously recycled between the primary filtration tank 520 and secondary filtration tank 550 using pump 560. Additives can be added as desired.

The water is then exposed to UV light by pumping it using pump 570 to a glass walled cylinder 572 around an ultraviolet light assembly 574.

After being exposed to UV light, the water is pumped using pump 580 to a final holding tank 590 and through a final stage of filters 592, 594 and 596. These filters preferably comprise a flat roll filter material 700 infiltrated with activated charcoal, as shown in FIG. 3C. A charcoal impregnated flat filter 701 encased on two sides by outer filter materials 702 and 704. Filter materials 702 and 704 are sealed along the length of the filter material 700 at 706 and 708 using any desired sealing method, such as sonic welding, heat sealing or gluing. Preferably, the outer filter materials 702 and 704 are a smaller size than the inner activated charcoal impregnated filter material 701. For example, the filter materials 702 and 704 can be in the range of about 5 micron and less in size, preferably about 1 micron or less, more preferably about 0.5 to about 0.01 micron in size, and the filter material 701 can be about 1 to about 10 microns, preferably about 1 to about 5 microns in size.

In another embodiment, the outer filter 704 is a smaller size than the outer filter 702 and the filter assembly is used such that the flow of water is through the larger size outer filter 702 before the smaller size outer filter 704. For example, in this embodiment the outer filter 702 has a size of 5 microns or less and the outer filter 704 has a size of 0.5 to 0.1 micron in size.

Final additives can be introduced in the final holding tank 590. Clean potable water can be removed through outlet 598.

Pumps may be deleted as desired by using a cascading assembly.

Some, or all, of the filters can be of an automated roller system with sensors that can automatically advance the filter paper as needed.

One or more of the tanks can be deleted depending on the particular application.

The filters and filter assemblies can be as described in my co-pending U.S. patent application Ser. No. 10/636,808, filed Aug. 7, 2003, the complete disclosure of which is incorporated herein by reference.

The first and second filter assemblies can be hinged for easy change out of the filter material without having to remove the whole filter tray, as described above.

Figure 3B:
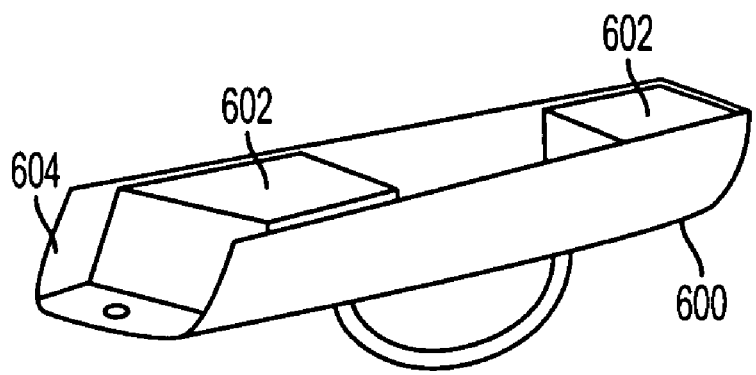
FIG. 3B illustrates a view of a magnetic filter mount.
Figure 3C:
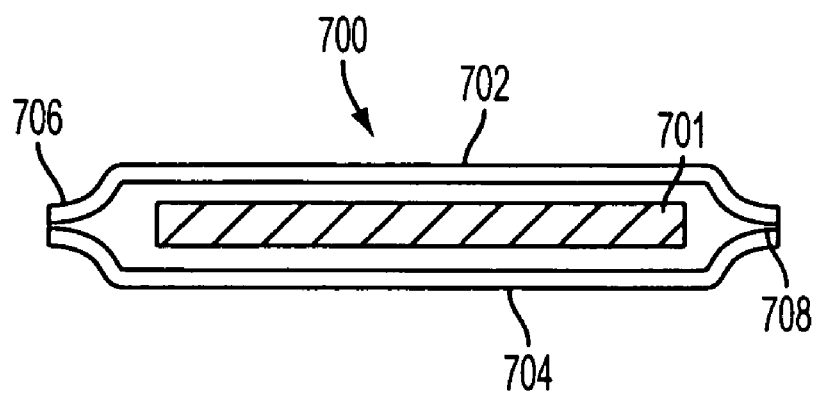
FIG. 3C illustrates a view of an activated material impregnated flat roll Filter material.

The filter material can be held in place using the structure shown in my co-pending application or by a magnetic filer holder comprising bar magnets as shown in FIG. 3B. The magnetic filter holder 600 is a channel style with two to three small magnets 602 set inside a channel 604. The magnets 602 are not held in by glue, but by powder coating the channel 604 with an epoxy powder, inserting the magnets 602 inside the channel 604 and then baking the unit to melt cure the epoxy powder and bind the magnets 602 to the channel 604. This is a much more cost effective way than the very expensive glues that are currently being used.

It is my belief that we will also be able to remove salt from sea water by adding magnesium chloride or another substance that will bond to, or react, to sea water and then filtering the sea water through our recycling system described herein. It is believed that the magnesium chloride bonds to the sea salt making the molecular structure large enough to be filtered out by using our 0.2 micron or the 0.05 micron filter material. It may be possible to shred the material and reuse the combined amalgam to salt roads, or the amalgam may be removed and the filter material reused.

Without being bound by any theory, it is also believed that when chlorides pass through the plastic filter material the chlorides become charged and are removed by the filter.

Filter Material

The filters preferably comprise a flat roll filter material 700 infiltrated or impregnated with an active material, as shown in FIG. 3C. An active material impregnated flat filter 701 encased on two sides by outer filter materials 702 and 704. Filter materials 702 and 704 are sealed along the length of the filter material 700 at 706 and 708 using any desired sealing method, such as sonic welding, heat sealing or gluing. Preferably, the outer filter materials 702 and 704 are a smaller size than the inner activated charcoal impregnated filter material 701.

For example, the filter materials 702 and 704 can be in the range of about 5 micron and less in size, preferably about 1 micron or less, more preferably about 0.5 to about 0.01 micron in size, and the filter material 701 can be about 1 to about 10 microns, preferably about 1 to about 5 microns in size. In another embodiment, the outer filter 704 is a smaller size than the outer filter 702 and the filter assembly is used such that the flow of water is through the larger size outer filter 702 before the smaller size outer filter 704. For example, in this embodiment the outer filter 702 has a size of 5 microns or less and the outer filter 704 has a size of 0.5 to 0.1 micron in size.

Examples of suitable active materials include a material that binds or otherwise removes an undesired material from the water filtered therethrough. Examples of suitable active materials include activated charcoal, lignite, positive charged polymers, laterite, silver, and activated aluminum. Other examples other examples of active materials include antibacterial and antifungal agents. The activate material can be present in an effective amount for removing the undesired material from water filtered therethrough. Examples of suitable amounts is from about 1% to about 90%, preferably from about 10% to about 50%, and most preferably about 30%, by weight.

Power Washer Recycling

As shown in FIGS. 4A–4G, the recycling apparatus 200 comprises a main tank 202 that is about four and a half feet wide, about four feet deep, and about four feet high. The exemplary main tank 202 is sized to operate with one standard spray washer operating at a maximum of about 5 gallons per minute. The main tank 202 can be sized for any desired flow rate and number of spray washers.

The main tank 202 is constructed of 14 gauge mild steel, but can be constructed of any desired material that is suitable to hold the filtered solution. Examples of suitable materials include, but are not limited to, metals, alloys, rubbers, plastics, glass, coated wood, or fiberglass. Preferably, if metal parts are utilized in the recycling apparatus 1, the metal parts are powder coated to prevent rust. The main tank 202 has about a 1.25 inch lip around the top formed by rolling the sheet metal back on itself to provide improved strength and safety.

Wash solutions are well-known and any conventional wash solution or even water run-off from vehicles can be used in the present recycling apparatus. While this embodiment is described with reference to the term "wash solution," this embodiment may be used to filter any type of water to form potable water and/or to clean up water for discharging to the environment, such as salt water, mine water runoff, wash water, and residential and industrial waste water. The wash solution may contain one or more phosphates as desied. The wash solution may be acidic or basic as desired. The wash solution is preferably free-of chemicals that cannot be recycled, such as butyl cellusolve (a glycol ether), which can vaporize or break down at 175° F. and cause undesirable vapors during spray washing. Preferably, the wash solution is free-of heavy metals such as molybdate, that are environmentally unfriendly. A suitable commercially available phosphate that can be combined with water to form the wash solution is sold under the name DuBoise Diversy/Lever, secure steam ultra. In some embodiments, the wash solution will be recovered filtered water from spraying trucks with fresh water and/or run off from trucks, as shown in the Examples below.

Connected to the main tank 202 is a filtering tank 208. The filtering tank 208 is about seven feet long, about 4 feet deep and about 3 feet high. The filtering tank is split into two separate tanks for holding the filtered wash solution, second tank 210 and primary tank 212 by baffle 211. The baffle 211 is about 6 inches high. The baffle can be formed from the same material as the holding tank, or any material suitable to hold the filtered solution. If desired, separate tanks can be used instead of splitting one large tank into smaller tanks with the use of baffles.

Figure 4A:
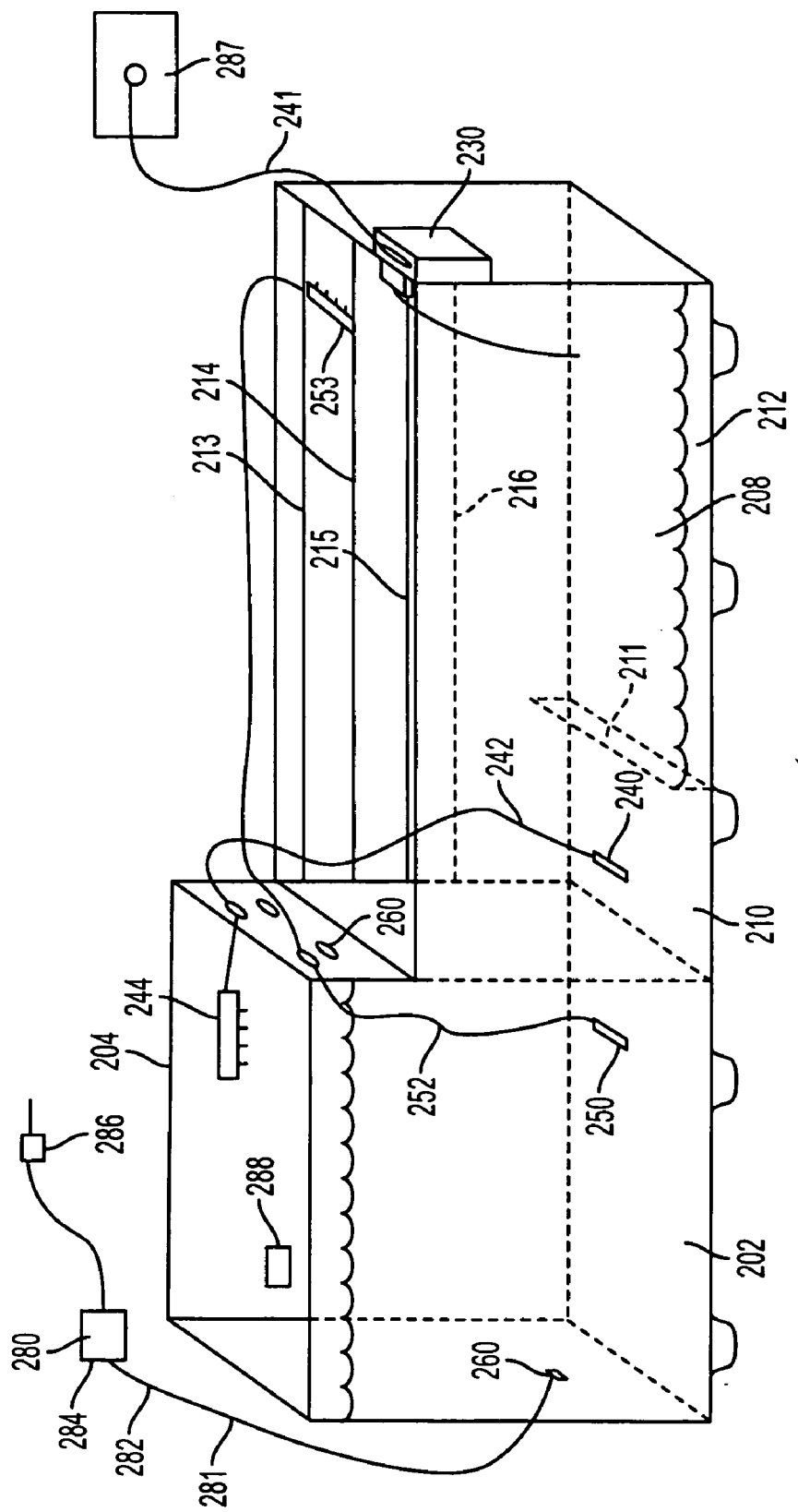
FIG. 4A illustrates a view of a water filtering apparatus and spray washer.
Figure 4B:
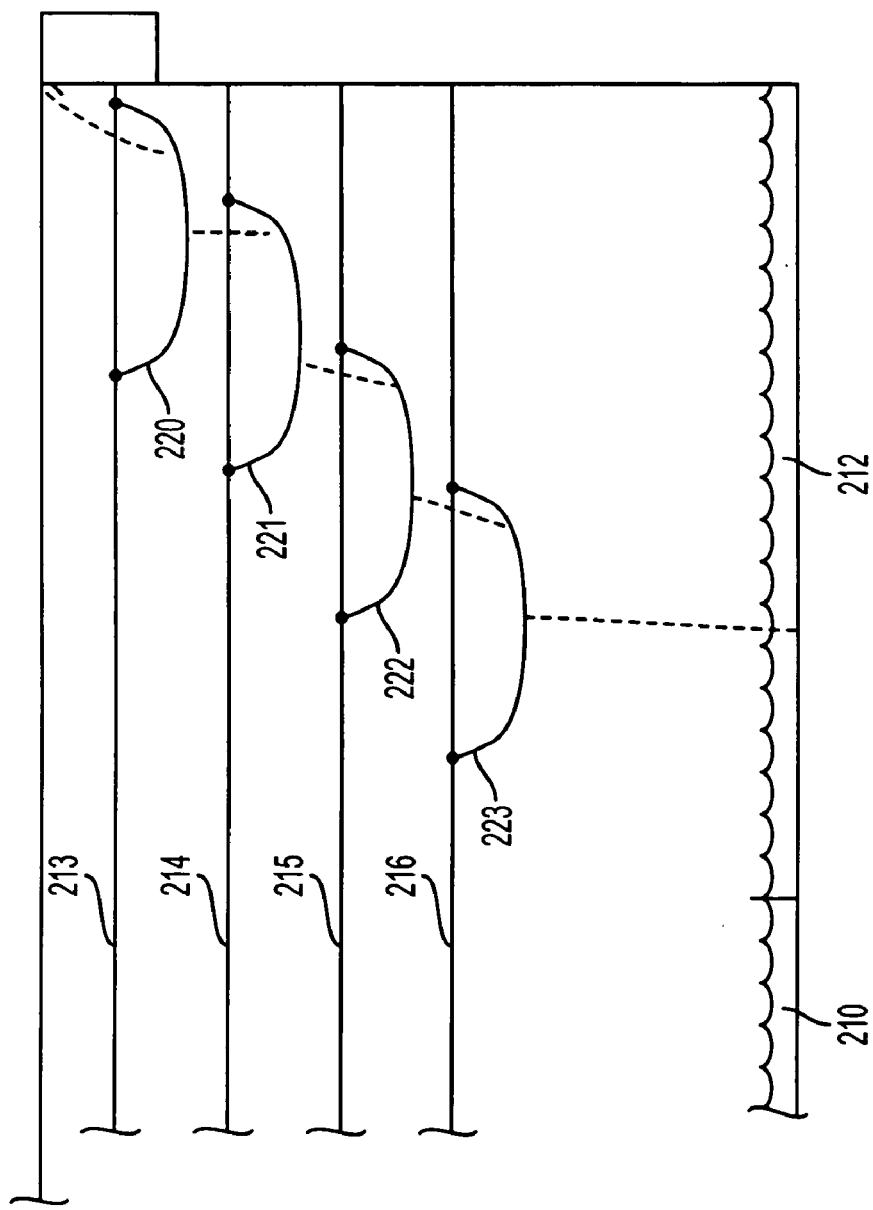
FIG. 4B illustrates a partial cut-away side view of a water filtering apparatus.

The filtering tank 208 contains associated pairs of slide rails 213, 214, 215 and 216 on two opposite inside surfaces for holding filter assemblies 220, 221, 222, 223, and 224. The filter assemblies each have associated mounts 225 formed from angle iron pieces welded to the filter assembly for movably holding the filter assembly on a pair of slide rails. Each filter assembly can be slid on a pair of slide rails for ease of replacing the filters, removing the filter assemblies, and/or for aligning the filter assemblies. FIG. 4B shows the filter assemblies in a preferred location, such filter assembly 220 drops filtered solution into one side of the filter assembly 221, and each successive filter assembly drops the filtered wash solution into a side of the next lower filter assembly.

The filter assemblies and slide rails are constructed and arranged such that during operation, the filtered wash solution drops about 1 inch to 30 inches, more preferably from about 2 inches to about 24 inches, more preferably from about 3 inches to about 12 inches, and most preferably about 6 to about 8 inches, before contacting the surface of the wash solution in the next filter below or tank to provide aeration.

The bottom of the filter assembly 221 is angled toward the center as shown in FIGS. 4C and 4D and formed of expanded mesh or perforations to allow the wash solution to pass through. In this manner, the flat filter material 228 lays down and substantially conforms to the shape of the filter assembly 221. Small creases may form in the filter material 227. The filter material is held in place on the edges from A to B using rods 228 and clamps 229. Any number of clamps 229 can be used to hold the rod 228 in place and apply pressure against the filter material 228 and filter assembly 221. Instead of rods, any shaped material can be used. If desired, the filter material 228 can be held in place using any of the means described herein, such as the magnetic filter holders. The other filter assemblies have structure similar to that described for filter assembly 221. If desired, any of the filter assemblies described herein or in my co-pending application U.S. Ser. No. 10/636,808, filed Aug. 8, 2003, the complete disclosure of which is incorporated herein by reference, can be utilized.

The preferred filter assembly shown uses a flat rolled filter material 228, which can be purchased in spools three feet wide and 150 feet long and easily cut to the proper length. Examples of preferred commercially available filter materials include, but are not limited to, the BR-60 and BR-80 series from Mountain States Filter, Colorado. Preferably, the flat filter material comprises plastic. While inexpensive flat sheets of filter cloth are preferred filters, any suitable filter material can be used as desired for the particular application. Any of the filter materials described herein can be utilized.

Used wash solution is collected and dirt separated therefrom in a pit 287 using the basin 289. The screened used wash solution is then pumped to an optional presediment tank 230 of the recycling apparatus using the pump 290 and line 291. The basin 289 is constructed to raise the pump 290 off of the bottom of the pit to reduce the amount of sediment transferred by the pump 290. The presediment tank 230 can be hung from the side of the as desired for the particular use. After sediments are removed from the wash solution in the presediment tank 230, the wash solution is dropped into the filter assemblies. The filtered wash solution leaving the filter assemblies drops into the primary tank 212.

Filtered wash solution in primary tank 212 flows over the baffle 211 and into the second tank 210. Filtered water from the second tank 210 is transferred to the main tank 202 using the pump 240 and line 242. An optional filter 244 can be provided on the line 242 to further filter the filtered water before entering the main tank 202.

Filtered wash solution from the main tank 202 is recycled to the filter assemblies using pump 250, line 252 and spreader 254. In this manner, wash solution is constantly recycled through the filter assemblies.

Filtered wash solution from the main tank 202 can be supplied to the power washer 280 using outlet 260 and line 281. Preferably, the outlet 260 removes filtered wash solution at least one foot from the bottom of main tank 202, and more preferably at least 1.5 feet from the bottom of the main tank. It is believed that undesirable residual chlorides reside in greater quantity at the bottom of the main tank 202 if present in the filtered wash solution.

The recycling apparatus 200 preferably contains a water level monitor 288 in the main tank 202 to alert the user of low wash solution conditions. If desired, the water level monitor 200 can be connected to a water supply to automatically add water to the recycled wash solution tank 200 through inlet 202 as needed. The water level monitor 200 can be any conventional water level monitor, such as commonly used in toilets or the well-known water levelers used in the commercially available Swamp Cooler™. The main tank 202 preferably contains one or more overflow outlets 26 that drain into the second tank 210 to prevent overfilling of the main tank 202.

During operation, the recycling apparatus 200 is connected to a power washer 280 using hose 281. The power washers 280 heats the wash solution to any desired pressure and temperature, for example, about 180 to about 220° F. and about 1500 to about 3000 psi. The object to be washed is sprayed with the heated pressurized wash solution using the wand 286. The used wash solution is collected and the dirt separated therefrom in a pit 287 using the basin 289. The screened used wash solution is then pumped to the optional presediment tank 230 of the recycling apparatus using the pump 290 and line 291 to form a continuous loop through the recycling apparatus 200.

Conventional spray washers 280 have two inputs, a fresh water input 282 and chemical input 284. When the present recycling apparatus is utilized in a manner to supply a recycled wash solution containing chemicals, it can be supplied to the spray washer 280 through the fresh water input 282. The chemical input 284 and any associated metering unit can be removed since they are no longer needed, which usually results in a desired increase of pressure at the spray wand 286. By using the present recycling apparatus, a less complicated spray washer 282 can be utilized that does not have a chemical input 284 and metering unit since the chemicals can be added to the recycling apparatus. The coil for heating fresh water in the spray washer 282 usually comprises black pipe and brass fittings, which can be corroded by the chemicals when present in the wash solution. Thus, preferably, if present, the black pipe and brass fittings are replaced with stainless steel or another material that does not corrode in the presence of the chemicals.

Preferably, no high-voltage electricity is utilized in the water recycling or purifying apparatuses described herein to provide enhanced safety. In this regard, the pumps are all preferably pressurized air operated pumps. Commercial examples of suitable air operated pumps include those sold under the Ingersoll-Rand ARO line, such as the Model 6660.

The air operated pumps are preferably mounted inside the tanks so that if there are any leaks in the pump they will be contained. However, if desired, the pumps can be mounted external to the tanks.

The recycling apparatus and method described herein is environmentally friendly. Bacterial and fungus buildup in the recycling apparatus is substantially avoided without the use of environmentally unfriendly chemicals by a combination of continuous aeration and filtering. The phosphate, which is usually of the same type as used in laundry and dish washers as a cleaning and disinfecting agent, will help kill the bacteria. Furthermore, the high temperature achieved in the power washer will kill even more bacteria.

Heat Recovery

Many powder coating operations utilize an oven 300 for baking the powder coating thereon. Once the baking procedure is complete, the substantial amount of heat for heating the oven 300 is simply allowed to dissipate into the atmosphere. Applicant applies heat exchangers 302 and 304 to the oven to thereby transfer wasted heat from the oven 300 to the recycled wash solution 202 using lines 312, pump 310, outlet 308 and inlet 306. Optionally, the heated recycled wash solution leaving the heat exchangers 302 and 304 can be supplied directly to the line 281 and power washer 280 using line 314. The heat exchangers 302 and 304 can be turned off and on selectively using valve 303 so that the heat exchangers 302 and 304 are only on when the baking procedure is complete. Alternatively the heat exchanger 302 can be located above the oven 300 and turned on continuously, such that heat escaping from the oven 300 heats the heat exchanger 302 during and after the backing procedure. In this manner, the substantial cost of heating the power washing solution will be greatly reduced.

Street Cleaners

Street, sidewalk and floor cleaners containing a sprayer and vacuum system for sucking up sprayed cleaning solution have the problem of how to discard the waste. The filtration systems described herein can be used to treat the vacuumed wastewater so that it can be reused for cleaning surfaces.

Portable Spray System

The spray wash systems described herein can be made portable. The portable spray wash system includes a filtration system as described herein in communication with a power spray washer and generator to power the power spray washer and filtration system. The portable system also includes a vacuum system or portable drain system and pump to return the used wash solution to the filtration system. The whole system can be mounted on a portable transport.

Dairies

Dairies use large amounts of water in processing cheese. For example, vats, bottles and other equipment must be washed and rinsed and the cheese is formed in water. The waste water from this use can be filtered through any of our filtering systems described herein or our parent applications, and then used to clean sinks, tables, floors, etc.

The filtering system can be modified and sized as desired for the particular application. If bacteria is a problem, silver nitrate or other antibacterial agents, or a UV light source, can be utilized.

In the cheese industry, the loss of whey is great. Our filtering system can be used to separate the whey from the process water for reuse.

Wineries

Wineries use large amounts of water in processing wine. For example, vats, bottles and other equipment must be washed and rinsed prior to use. Furthermore, the manufactures of the bottles, such as Ball Jar, need to flush the bottles prior to usage. The waste water from these uses can be filtered through any of our filtering systems described herein or our parent applications, and then used to clean sinks, tables, floors, etc.

The filtering system can be modified and sized as desired for the particular application. If bacteria is a problem, silver nitrate or other antibacterial agents, or a UV light source, can be utilized.

PVC and Plastics Extrusion

Plastics and pvc extrusion plants must cool their extruded product as it is forced out of the forming dies. The discharge water usually has a bacterial problem since the cooling water is typically in a closed system. By using one of our filter systems, with its aeration through the filters, in this case three to four separate filter levels, the water is oxygenated. Oxygenated water retards the growth of bacteria. The filter media is selected to remove contaminates from the water. Pumps may not be needed if the filtering system is higher than the holding vat for the water. A once pass through system is normally all that is required since the holding tank usually has its own associated pumping system to transfer treated water to the forming dies.

A water filtration system was tested at an extrusion plant and the results are shown in the attached table entitled "Chemical Usage Post TASROP Installation." As shown in that table, the plant had an annual chemical cost of $16,034 to treat the process water. During the past 8 months time, the process water quality was fair at best. On Sep. 7, 2004, a trial filtration system was installed. There was a visible marked improvement in the water quality. The expected annual cost savings is $8,500.

Gypsum

Natural gypsum and its man-made replacement can be added to water to form a slurry for flow purposes. After forming the desired shape, the water must then be removed. This discharged water normally picks up contaminates that prevent it from being recycled causing a loss of the water and any good gypsum from being reused. Depending on the size of the location, one or more filtering systems, having optimized pumps, filter media, filter numbers, flow meters, back flush devices and automated filter advancing capabilities, will allow the water and the separated product to be recycled.

Uranium Recovery

It is now known that certain bacteria have the ability to consume material containing uranium, such as waste uranium, and retain the uranium in their bodies. Thus, the bacteria can be spread over a waste site containing uranium and the bacteria will concentrate the uranium in their bodies. The bacteria containing uranium can be separated from their surroundings by filtration using the filter systems described herein. The bacteria and filter media containing them can then be combusted to provide concentrated uranium waste. In this manner, uranium can be recovered or separated easily and economically from a waste site or any desired site, including creeks and rivers.

EXAMPLES

In the Examples, the filter media was in a sheet form ranging from 1 foot wide×1 foot long to 6 feet wide×10 feet long. A sock style filter is currently being tested by the Colorado Department of Transportation (CDOT) that slides up over the lip on the pre-sediment tank and is tied to the spreader tube attached to the pre-sediment tank. This sock style filter is much easier to replace than the tray filter. The sock style filter can be formed by overlapping the filter sheet and sealing the ends.

The filtration size of the media used ranged from about 0.01 micron (1 micron=0.000039 inches) to about 10 microns. Particular filtrations sizes used were 0.2 microns, 0.2 micron, 0.5 micron, 1 micron, 3 micron, 5 micron, and up in increments as needed. This varied in capability by as much as 25%. The micron capability is primarily determined by the weight of the cloth used and can be varied as needed.

The manner in which the different filter media's were used depended on what the challenge was. Different media were used at different stages to accomplish a wide range of effects. Different filter media types were also used together to provide desired effects.

We used from 1 to 5 filter assemblies in each filtration apparatus. The filter assemblies were layered as needed with the filter sheet media. Usually the filter sheet media was selected so that the filter assemblies above act to catch heavier or larger contaminants and the filter assemblies below catch anything that might leach out of the above filter assemblies.

A water purification apparatus as shown in FIG. 1A was installed at the Frisco CDOT site. The water run-off from the CDOT trucks and equipment contains inorganic and organic contaminates that cannot be discarded using public waster water treatment. This waste water is currently trucked off site and stored in a storage facility. Once the storage facility reaches capacity, it costs the state of Colorado about $70,000 to have the waste water treated at a hazardous waste treatment site. The Frisco filtration system did not include the use of the 0.2 micron filter sheet material since it was not available.

Water samples were collected and tested before (Pre-Test) and after filtration (TS-1, TS-2, and TS-3) by CDOT personnel. The test results are disclosed in Table 1 below. Water samples were also collected and tested before and after filtration by an independent test lab, Analytica. Analytica prepared three extensive test reports dated Dec. 29, 2003, Jan. 12, 2004 and Feb. 13, 2004, that are disclosed in U.S. appl'n ser. No. 60/598,443, filed Aug. 4, 2004, which is part of the present application.

TABLE 1

| ANALYTE | MCL | Pre-Test | TS-1 Dec. 29, 2004 | TS-2 Jan. 12, 2004 | TS-3 Jan. 29, 2004 |
|---|---|---|---|---|---|
| Volatile Organic Contaminents | | | | | |
| 1,1,1,2-Tetrachloroethane | 5 | <1.2 | ND | ND | ND |
| 1,1,1-Trichloroethne | 200 | <1.2 | ND | ND | ND |
| 1,1,2,2-Tetrachloroethane | 5 | <1.1 | ND | ND | ND |
| 1,1,2-Trichloroethane | 5 | <2.2 | ND | ND | ND |
| 1,1-Dichloroethane | | <1.4 | ND | ND | ND |
| 1,1-Dichloroethylene | 7 | <1.7 | ND | ND | ND |
| 1,1-Dichloropropene | | <0.93 | ND | ND | ND |
| 1,2,3-Trichlorobenzene | 70 | <0.78 | ND | ND | ND |
| 1,2,3-Trichloropropane | | <2.5 | ND | ND | ND |
| 1,2,4-Trichlorobenzene | 70 | <0.59 | ND | ND | ND |
| 1,2,4-Trimethylbenzene | 70 | 2.6 | ND | ND | ND |
| 1,2-Dibromo-3-Chloropropane | 0.2 | <5.9 | ND | ND | ND |
| 1,2-Dibromomethane | | <0.86 | ND | ND | ND |
| 1,2-Dichlorobenzene | 600 | <1.1 | ND | ND | ND |
| 1,2-Dichloroethane | 5 | <1.8 | ND | ND | ND |
| 1,2-Dichloropropane | 5 | <1.8 | ND | ND | ND |
| 1,3,5-Trimethylbenzene | | <1.2 | ND | ND | ND |
| 1,3-Dichlorobenzene | 620 | <1.1 | ND | ND | ND |
| 1,3-Dichloropropane | | <0.66 | ND | ND | ND |
| 1,4-Dichlorobenzene(p-) | 75 | <1.4 | ND | ND | ND |
| 2,2-Dichloropropane | | <1.4 | ND | ND | ND |
| 2-Butanone | | <2.6 | ND | ND | 2.7J |
| 2-Chloroethyl Vinyl Ether | | <1.2 | ND | ND | ND |
| 2-Chlorotoluene | | <0.56 | ND | ND | ND |
| 2-Hexanone | | <0.87 | ND | ND | ND |
| 4-Chlorotoluene | | <1.2 | ND | ND | ND |
| 4-Isopropyltoluene | | <0.57 | ND | ND | ND |
| 4-Methyl-2-Pentanone | | <0.76 | ND | ND | 86 |

TABLE 1-continued

| ANALYTE | MCL | Pre-Test | TS-1 Dec. 29, 2004 | TS-2 Jan. 12, 2004 | TS-3 Jan. 29, 2004 |
|---|---|---|---|---|---|
| Acetone | | 60 | 76B | 6.6J | 230 |
| Acrylonitrile | | <1.6 | ND | ND | ND |
| Benzene | 5 | <0.88 | ND | ND | .81J |
| Bromobenzene | | <1.7 | ND | ND | ND |
| Bromochloromethane | | <1.7 | ND | ND | ND |
| Bromodichloromethane | 0.56 | <1.1 | ND | ND | ND |
| Bromoform | 4 | <1.6 | ND | ND | ND |
| Bromomethane | | <3.8 | ND | ND | ND |
| Carbon Disulfide | | <0.66 | ND | ND | ND |
| Carbon Tetrachloride | 5 | <0.85 | ND | ND | ND |
| Chlorobenzene | 100 | <0.55 | ND | ND | ND |
| Chloroethane | | <1.8 | ND | ND | ND |
| Chloroform | 6 | <1.3 | ND | ND | ND |
| Chloromethane | | <1.4 | ND | ND | ND |
| cis-1,2-Dichloroethylene | 70 | <1.2 | ND | ND | ND |
| cis-1,2-Dichloropropene | | <0.38 | ND | ND | ND |
| Dibromochloromethane | 0.42 | <1.6 | ND | ND | ND |
| Dibromomehane | | <1.1 | ND | ND | ND |
| Dichlorodifluoromethane | | <3.0 | ND | ND | ND |
| Ethyl Benzene | 680 | <0.93 | ND | ND | ND |
| Hexachlorobutadiene | 1 | <2.1 | ND | ND | ND |
| Iodomethane | | <2.1 | ND | ND | ND |
| Isopropylbenzene | | <0.40 | ND | ND | ND |
| m&p-Xylene | 10,000 | <0.76 | ND | ND | ND |
| Methylene Chloride | 5 | <5.8 | ND | ND | ND |
| Naphthalene | | <0.49 | ND | ND | ND |
| n-Butylbenzene | | <0.47 | ND | ND | ND |
| n-Propylbenzene | | <0.81 | ND | ND | ND |
| O-Xylene | 10,000 | <1.4 | ND | ND | 1.7J |
| sec-Butylbenzene | | <0.46 | ND | ND | ND |
| Styrene | 100 | <0.82 | ND | ND | ND |
| tert-Butyl Methyl Ether | | <0.61 | ND | ND | ND |
| tert-Butylbenzene | | <1.1 | ND | ND | ND |
| Tetrachlroethylene | 5 | <0.58 | ND | ND | ND |
| Toluene | 1,000 | <1.3 | ND | ND | 1.8J |
| trans-1,2-Dichloroethylene | 100 | <1.8 | ND | ND | ND |
| trans-1,2-Dichloropropene | 100 | <0.99 | ND | ND | ND |
| trans-1,4-Dichloro-2 Buten | 100 | <3.1 | ND | ND | ND |
| Trichloroethylene | 5 | <1.3 | ND | ND | ND |
| Trichlorofluromethane | | <1.7 | ND | ND | ND |
| Trichlorotrifluoroethane | | <1.9 | ND | ND | ND |
| Vinyl Acetate | | <1.1 | ND | ND | ND |
| Vinyl Chloride | 2 | <1.6 | ND | ND | ND |
| Diesel Range Organics | | 230,000 | | 8,100 | |
| Gasoline Range Organics | | 970 | | <100 | |
| Metals/Inorganics | | | | | |
| Aluminum | 5,000 | <6.6 | 3,360 | 69 | 449 |
| Antimony | 6 | 7.4 | 1.68 | 3.92 | 2.34 |
| Arsenic | 10 | 69 | 4.19 | 2.84 | 9.27 |
| Barium | 2,000 | 172 | 592 | 298 | 651 |
| Boron | 750b | 4,700 | 310 | 310 | 1,100 |
| Beryllium | 4 | <0.9 | 0.172 | <.05 | 0.0553 |
| Cadmium | 5 | <1.2 | <.1 | <.1 | 0.598 |
| Chloride | 250,000a | 6,700,000 | 450,000 | 2,700,000 | 11,000,000 |
| Chromium | 100 | 8.52 | 9.66 | 1.33 | 4.54 |
| Copper | 300 | 46.5 | 24.1 | 19.8 | 33.6 |
| Cyanide | 200 | <4 | | | |
| Fluoride | 4,000 | 36,000 | | | |
| Iron | 5,000 | <4 | 420 | 270 | 1,700 |
| Lead | 15 | 24 | 14.4 | 10.2 | 13 |
| Manganese | 800 | 1,000 | 888 | 362 | 1,250 |
| Mercury | 2 | <0.2 | <0.2 | <0.2 | <0.2 |
| Nickel | 100 | 12.2 | 14.7 | 5.06 | 13.8 |
| Thallium | 2 | <0.34 | | | |
| Zinc | 2,000 | 6,770 | 926 | 744 | 626 |

8,000,000 is acceptable.

MCL is the maximum allowable concentration.

Black space means the test was not conducted.

ND means there was no detectible amount of contaminate present.

As can be seen from the test data provided in Table 1 and the Analytica reports, the present filtration apparatus surprisingly removed a very large number of undesirable organic and inorganic contaminates. The plastic filter sheet material utilized is not known by those skilled in the art to remove these types of contaminates. The removal of these contaminates was completely unexpected. The waste water was sufficiently cleaned so that it could be discarded using the public waste water treatment, which avoided the very high cost of hazardous material treatment.

Because the Frisco site was so successful, the CDOT installed 10 further locations, of which 8 are currently online. The new locations used an apparatus as shown in FIGS. 4A–4G. The filtration size was:

1 filter—5 mic
2 filter—1 mic
3 filter—0.5 mic
4 filter—0.2 mic
5 filter—0.2 mic The #1 filter is the top most filter and the #5 filter is the lowest. The filter material is a heat welded polyester sheet. The CDOT sites used an Alaadin power washer model # T416, 3,000 psi, 4 gallon per minute, 220v, which is propane or natural gas heated. The CDOT bays range in size to accommodate from 3 to 16 vehicles and equipment.

CDOT also recently tested the chloride concentration in five of the locations using chloride strips and the results are shown in Table 2. 8000 ppm of chloride is considered acceptable. However, the lower the chloride level the better.

TABLE 2

| Date and Location | Pre-Filter | Post-Filter |
| --- | --- | --- |
| Boomfield Location | | |
| Dec. 22, 2004 | NP | Strip 4.8; 1,517 ppm |
| Dec. 29, 2004 | Strip 8.6; >6,211 ppm | Strip 6.2; 2,766 ppm |
| Derby Location | | |
| Dec. 1, 2004 | NP | Strip 7.0; 3,870 ppm |
| Dec. 9, 2004 | Strip 1.8; 308 ppm[1] | Strip 0.8; <257 ppm |
| Dec. 22, 2004 | NP | Strip 1.8; 308 ppm |
| Dec. 29, 2004 | NP | Strip 3.3; 804 ppm |
| Havana Location | | |
| Nov. 23, 2004 | Strip 7.8; 5,608 ppm | Strip 1.6; 257 ppm |
| Dec. 10, 2004 | Strip 8.2; >6,211 ppm | Strip 8.0; 6,200 ppm |
| Dec. 22, 2004 | NP | Strip 7.7; 5,347 ppm |
| Dec. 29, 2004 | NP | Strip 4.8; 1,571 ppm |
| Knox Ct. Location | | |
| Dec. 29, 2004 Valley Hwy | NP | Strip 4.8; 1,571 ppm |
| Dec. 12, 2004 | NP | Strip 1.8; 308 ppm |

[1] The filtration system was cleaned out and filled with fresh water just before the test, which explains the low pre-filter chloride concentration. NP = Not Performed.

The test data demonstrates that the present filtration system is capable of cleaning up the CDOT water run-off to such a degree that it is no longer considered hazardous material. The filtrated water can simply be discarded using public waste treatment facilities saving the CDOT many thousands of dollars. Furthermore, the present filtration systems can be run as closed systems so that no waste water needs to be discarded.

While the claimed invention has been described in detail and with reference to specific embodiments thereof, it will be apparent to one of ordinary skill in the art that various changes and modifications can be made to the claimed invention without departing from the spirit and scope thereof.

The invention claimed is:

1. A method of recycling wash solution from a power washer comprising;

filtering wash solution through a first filter assembly having a first filter sheet under ambient pressure to form a first filtered wash solution and allowing the first filtered wash solution to flow into a second filter assembly;

filtering the first filtered wash solution through the second filter assembly having a second filter sheet of 10 micron or less filtration size under ambient pressure to form a recycled wash solution and allowing the recycled wash solution to drop a second distance into a recycled wash solution tank before contacting a surface of the recycled wash solution being contained in the recycled wash solution tank, the second distance being sufficient to aerate the recycled wash solution in the recycled wash solution tank;

supplying the recycled wash solution to a power washer;

washing an object with the recycled wash solution;

collecting wash solution from the washing step; and supplying at least a portion of the collected wash solution to the first filter assembly for recycling.

2. A method according to claim 1, further comprising the step of continuously monitoring the level of wash solution in the recycled wash solution tank and automatically adding water as needed.

3. A method according to claim 1, further comprising transferring recycled wash solution from the recycled wash solution tank to at least one of the first and second filter assemblies to remove precipitates formed in the recycled wash solution tank.

4. A method according to claim 1, further comprising the step of removing oil from the wash solution prior to filtering through the first filter assembly.

5. A method according to claim 1, further comprising using a 10 micron or less filtration size in the first and second filter sheets.

6. A method according to claim 1, further comprising using filtration size of about 0.2 microns or less in the second filter assembly to remove heavy metals from solution.

7. A method according to claim 1, further comprising cutting the first and second filter sheets having a width of at least 1 foot and a length of at least 2 feet from one or more rolls of sheet material.

8. A method according to claim 1, further comprising drying a used filter, combining the dried used filter with powder coating materials, and firing the used filter and powder coating materials in an oven to bind the heavy metals.

9. A method according to claim 8, wherein the powder coating materials are waste powder coating materials collected from the floor following powder coating an object.

10. A method according to claim 1, further comprising filtering the first filtered wash solution through at least one other filter assembly before supplying the filtered wash solution to the second filter assembly.

11. A method according to claim 1, wherein the power washer is a car washer, a steam washer, or a laundry machine.

12. A method according to claim 1, further comprising screening the collected wash solution to remove particles prior to supplying the collected wash solution to the first filter assembly.

13. A method according to claim 1, wherein any pumps used to move the solution are air pressure driven.

14. A method according to claim 1, wherein the filtered wash solution comprises wash chemicals and the filtered wash solution is supplied to the water inlet of the power washer.

15. A method according to claim 1, wherein the filtered wash solution comprises water run-off from vehicles.

16. A method according to claim 1, wherein the first and second filter assemblies are constructed and arranged such that during operation the wash solution filters through the first filter assembly to form the first filtered wash solution and drops into the second filter assembly a first distance before contacting first filtered wash solution in the second filter assembly to provide aeration.

* * * * *